United States Patent [19]
Weisglass et al.

[11] 3,754,823
[45] Aug. 28, 1973

[54] LIGHT SOURCE FOR COLOR ENLARGERS

[75] Inventors: Louis L. Weisglass, New York, N.Y.; Robert A. Flieder, Englewood Cliffs, N.J.; Alfred Simmon, New York, N.Y.

[73] Assignee: Berkey Photo, Inc., Woodside, N.Y.

[22] Filed: Dec. 14, 1971

[21] Appl. No.: 207,808

[52] U.S. Cl. .................................. 355/35, 355/71
[51] Int. Cl. ........................................ G03b 27/76
[58] Field of Search ................... 355/67, 70, 71, 35

[56] References Cited
UNITED STATES PATENTS

| | | | |
|---|---|---|---|
| 3,028,483 | 4/1962 | Simmon | 355/70 X |
| 3,458,254 | 7/1969 | Aston | 355/35 |
| 3,536,402 | 10/1970 | Aston | 355/71 X |
| 3,011,388 | 12/1961 | Baumbach et al. | 355/35 X |
| 3,546,374 | 12/1970 | Graser, Jr. | 355/71 X |

Primary Examiner—Samuel S. Matthews
Assistant Examiner—Richard A. Wintercorn
Attorney—Toren & McGeady

[57] ABSTRACT

In the photographic enlarging apparatus disclosed, three filters partially intercept a white light beam emerging from a light source having a reflector. The filters divide the beam into a white portion and an intensely colored portion. A mixing chamber mixes the white and intensely colored light. A diffuser at the bottom of the chamber illuminates a color film, either negative or positive slide. Optical means focus the light at the film onto printing paper. A light attenuator composed of a perforated metal plate is interposed between the source and the filters to dim the total light output of the enlarger. Mechanical means allow the attenuator to be shifted into and out of the beam. The face of the attenuator directed away from the source and toward the filters is provided with a reflecting surface. This reflecting surface prevents an undesirable color shift when the attenuator is moved into or out of the beam.

20 Claims, 11 Drawing Figures

Patented Aug. 28, 1973
3,754,823
3 Sheets-Sheet 1
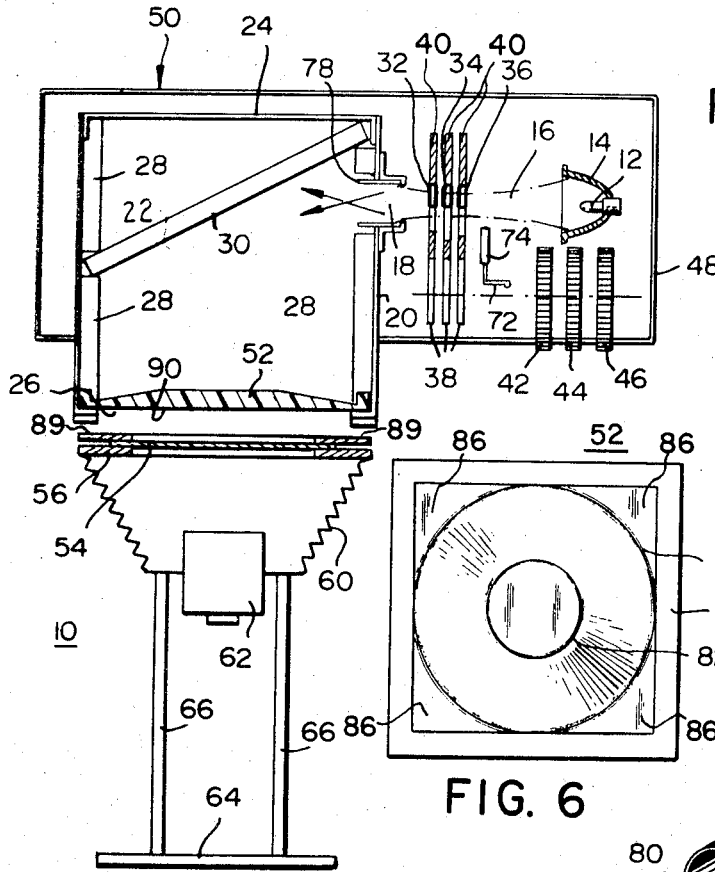
FIG. 1
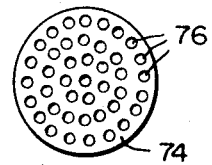
FIG. 3
FIG. 6
FIG. 5
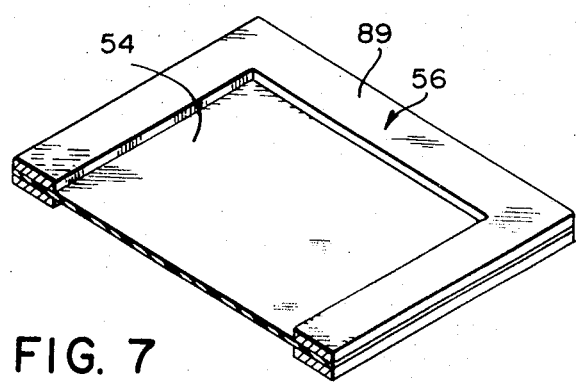
FIG. 7
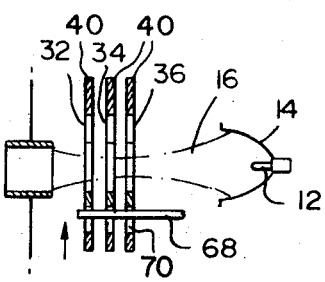
FIG. 2
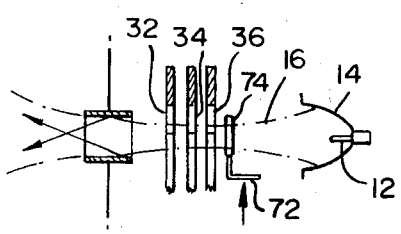
FIG. 4

Patented Aug. 28, 1973 3,754,823

LIGHT SOURCE FOR COLOR ENLARGERS

CROSS-REFERENCE TO RELATED APPLICATIONS

This application is related to the following applications being filed on or about the data of this application. The contents of those applications filed concurrently herewith or before this application are herewith made a part of this application as if fully recited herein. All these applications are assigned to the same assignee as this application:

Application of Louis L. Weisglass and Robert A. Flieder, entitled "Illuminating System For Color Enlargers And The Like";

application of Louis L. Weisglass, entitled "Color Enlarging Apparatus"; and application of Louis L. Weisglass, Robert A. Flieder, and Lewis Rubin, entitled "Light Color-Control Apparatus".

This application contains subject matter disclosed in disclosure document No. 006643 dated Sept. 14, 1971.

BACKGROUND OF THE INVENTION

This invention relates to light sources for color enlargers, and particularly to means for maintaining the same color balance at various illumination intensities in color enlargers.

Photographic color enlargers require a lighting system which is capable of accurately compensating for the color balance in the film being enlarged, the color printing paper recording the image, and the color of the "white" light source. The term "film" refers to a transparency or a negative or positive slide, whose image is focused upon printing paper for the purpose of enlarging and printing the image. Thus, such lighting systems must include filters that color the light to an extent suitable for compensating for the colors of the film paper and source. It is desirable that the light produced be substantially uniform in intensity, chromatically, and saturation, across the film which it illuminates.

One method of achieving such a result is to intercept a white light beam source with three dichroic filters. This forms a beam, one portion of which is white and the other portion of which is intensely colored. The beam is then passed to a mixing chamber where the colored and white portions are mixed. A diffusion plate passes the mixed light to the color film. An optical system then focuses the image produced by the color film onto color printing paper. By varying the relative degrees of intercept of the respective filters with the white light beam it is possible for an operator to establish accurately a predetermined chromaticity or color balance. This chromaticity is selected to compensate for the color balance of the paper, film and light. The overall or average degree of interception determines the overall saturation of the color applied to the film.

The color heads or lamp houses of such enlargers are generally powerful in light output in order to shorten exposure time at large magnification ratios. However, very short exposure times are not desirable because the color paper shows an appreciable shift in color balance. This shift is due to so-called reciprocity failure in color balance. Thus, at small magnification the exposure time is generally short. When the objective of the optical system does not allow any further stopping down, neutral density filters are applied.

Neutral density filters of the carbon-deposited type, which are neutral to white light, nevertheless produce a color shift. This is so because the short blue wavelengths are absorbed at a different rate as the long red wavelengths.

Another way of reducing the light flux produced is to interpose a light attenuator between the source of the white light beam and the filters. Such an attenuator is composed of a black metal plate with a multiplicity of perforations. The ratio of the area of the perforations to the area of the opaque metal plate determines the ratio of light reduction. Such a light attenuator is mechanized so as to be shiftable into the beam or out of it by the operator.

However, the use of such an attenuator produces another disadvantage. It has been discovered that such an attenuator causes a shift in the color of the light emerging from the mixing chamber.

An object of the invention is to overcome the above-mentioned disadvantages.

Another object of the invention is to improve lighting systems for photographic color enlargers.

SUMMARY OF THE INVENTION

According to a feature of the invention, these disadvantages are overcome, and the objects attained, by providing the side of the attenuator facing away from the beam source and facing from the dichroic filters with a reflecting surface.

The invention is based upon the recognition that a dichroic filter operates not only as a filter to pass a desired light color but reflects the complement of that color. Thus, the filters tend to divide the white light impinging thereon into one portion of a predetermined wavelength which is passed, and a second portion to another wavelength which is returned to the beam source. Within the beam source, the reflector then rereflects the colored light returned by the filters. The reflector is, in effect, then enriching the white beam it produces, with the returned light. Some of that enriched beam is not intercepted by the filters and passes into the mixing chambers. Thus, under normal circumstances, without the attenuator the light produced by the system is, in fact, somewhat enriched by light reflected by the filters. It should be understood that some of the light reflected by the filters, and again reflected by the reflector, enters that parts of the beam which is not intercepted by the filters.

This effect, in itself, causes no great problem because it is included in the color density calibration which can be read on a dial in the enlarger.

When the light attenuator is interposed between the beam source and the filters, the attenuator absorbs the reflected complementary colored light rays as they are reflected by the filters and also as they impinge from the direction of the reflector. This interferes with the enrichment of the white light and introduces a color shift.

A reflecting surface on the side facing the dichroic mirror has the effect of bouncing some of the filter-reflected light into the mixing chamber, to the same extent as the reflector when the attenuator is removed from the beam.

These and other features of the invention are pointed out in the claims. Other objects and advantages of the invention will become obvious from the following de-

BRIEF DESCRIPTION OF THE DRAWINGS

FIG. 1 is a somewhat schematic elevation of an enlarger embodying features of the invention;

FIG. 2 is a schematic illustration of a portion of FIG. 1 with filter moved out of the path of a light beam;

FIG. 3 is a drawing illustrating an attenuator of the enlarger of FIG. 1;

FIG. 4 is a schematic illustration showing the attenuator of FIG. 3 in the path of the beam of FIG. 1;

FIG. 5 is a perspective view of a cylindrical mirror in FIG. 1;

FIG. 6 is a plan view of the diffusing plate used in FIG. 1;

FIG. 7 is a perspective view of a film carrier forming a part of FIG. 1;

DESCRIPTION OF PREFERRED EMBODIMENTS

Figures 8, 9:
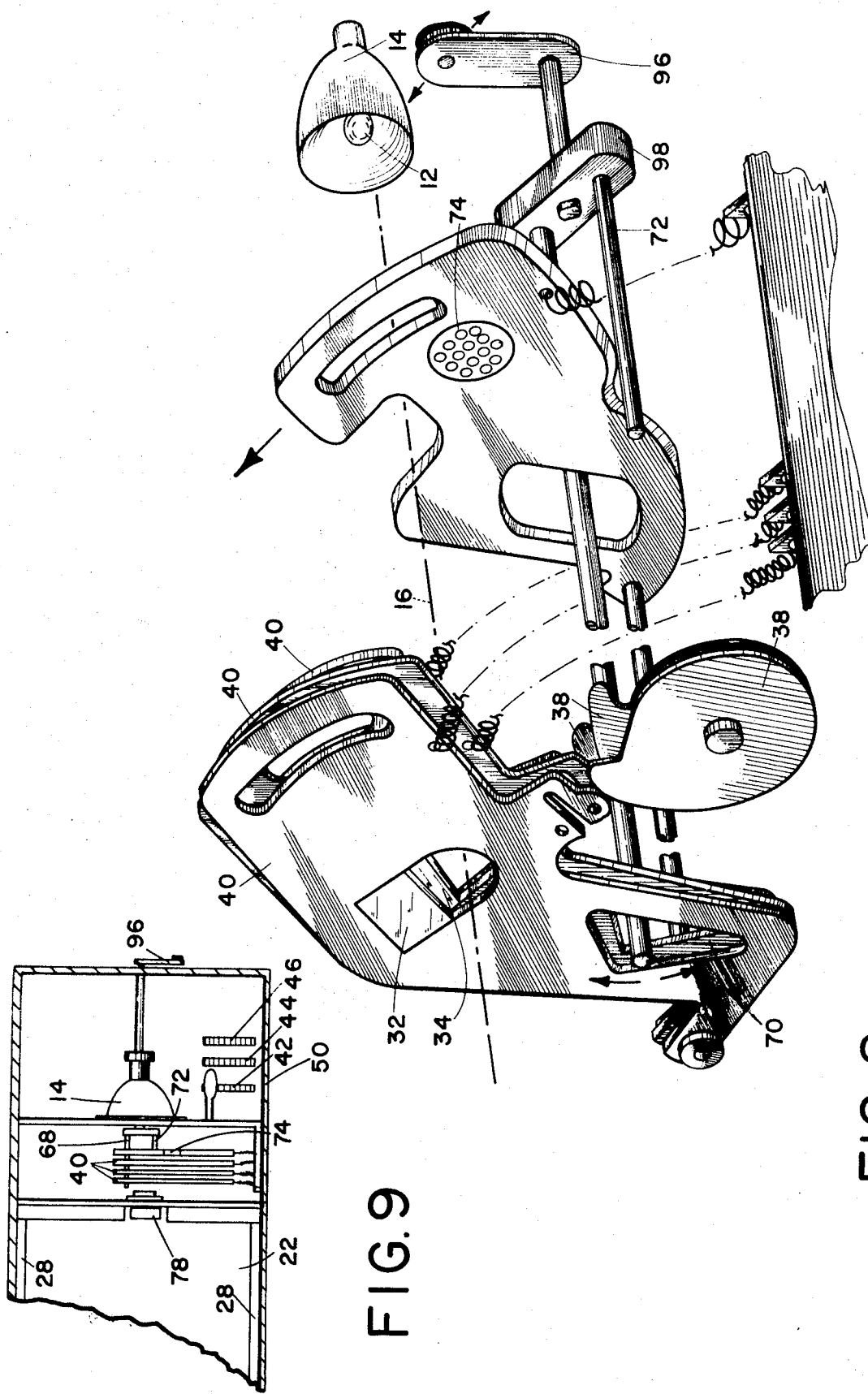
FIG. 8 is an exploded view of a filter control illustrated in FIG. 1.
FIG. 9 is a plan or top view of the structure of FIG. 8 assembled.

Before describing the rationale behind the invention in detail, the environment of the invention will be described.

In the enlarging apparatus 10 of FIG. 1, a light source 12, together with a substantially elliptical reflector 14, directs a light beam toward the entrance port 18 of the front wall 20 in a mixing chamber 22. The mixing or integrating chamber is composed of a metal shell 24 having an exit opening 26 extending virtually across the bottom. Solid, expanded white foam panels 28 line the front and side walls of the chamber 22 while a ceiling or roof panel 30 extends angularly upward from the end away from the source 12 toward the end closer to the source. The ceiling panel 30 disperses the light beam entering the entrance port 18.

Three dichroic filters 32, 34 and 36 intercept a portion of the beam so as to impart an intense color to the intercepted portion of the beam. The filters 32, 34 and 36 pass the respective subtractive primary colors, cyan, yellow and magenta. Suitable cams 38 move respective filter holders 40, which are each biased against cams 38 by respective springs, so that each filter 32, 34 and 36 intercepts a portion of the beam determined by the rotary position of the cam 38 engaging its holder 40. Each of the filters 32, 34 and 36 may then intercept different portions of the beam 16. Suitable knurled wheels 42, 44 and 46 extending through the housing 48 of the overall light mixer 50 are each coupled to one of the cams 38. Thus, an operator may set the intercepting portion of the filter 32 by turning the wheel 46 to a particular position. A digital indicator, not shown, apprises the operator of the extent to which the filter 32 intercepts the beam 16 and the extent to which the wheel 46 has been turned. Similarly, digital indicators indicate the extent to which the filters 34 and 36 enter the beam 16 on the basis of the extent to which the wheels 44 and 42 have been turned. The cams 38 and the wheels 42, 44 and 46 are coaxial with each other and coupled by coaxially surrounding shafts (not shown).

Within the chamber 22 the opaque ceiling panel 30, composed of a foam with a white roughened surface, disperses the partly colored beam in many directions. Together with the remaining panels 28, each of which correspond to the panel 30, it bounces the light back and forth in many directions. Ultimately, the panels 28 and 30 mix the white portion of the beam with the colored portion so as to achieve a saturation or density dependent upon the overall degree to which the filters 32, 34 and 36 extend into the beam. The color balance of the resulting light, the factor often called chromaticity, is determined by the degree to which each filter extends into the beam relative to the other filters.

The dispersed and mixed light leaves the chamber through a translucent opal diffusion or scattering plate 52 in the exit opening 26. This light can then illuminate an interchangeable color film 54, i.e. transparency, mounted in a removable film carrier 56. The plate 52 diffuses the light as it passes through. The diffused light is then passed from the negative 54 through adjustable bellows 60 to an adjustable objective 62. The latter focuses the light as modified by the negative upon printing paper (not shown) mounted on a carrier 64.

Suitable racks 66 support the relative projection portion of the enlarger 10 above the paper carrier. In the usual manner, the position of the projection portion of the enlarger is adjustable on the racks 66 by means of pinions for up and down movement. This adjusts the size of the image being focused upon the printing paper in the print carrier 64. The housing 50 can be removed from the enlarger for servicing and adjusting.

An arm 68 passing loosely through the opening 70 in the holders 40 can be operated from outside the housing 50 to withdraw all the filters simultaneously from the positions shown in FIG. 1, out of the beam 16, and into the positions shown in FIG. 2. This allows uncolored white light from the source 12 and the reflector 14 to illuminate the film 54. The wheels 42, 44 and 46 each only move one filter at a time with the cams 38.

Moreover, an arm 72, operable from outside of the housing 50, moves a light attenuator 74, such as shown in FIG. 3, from the position shown in FIG. 1, to the position shown in FIG. 4. The light attenuator is composed of a metal plate having a plurality of substantially evenly distributed light perforations 76. The perforations pass approximately 25% of the light. When moved into the position shown in FIG. 4, the light attenuator reduces the overall intensity of the light beam emerging from the source 12 and reflector 14 by 75%. It thus dims the illuminate of the film 54 and the image on the paper in the carrier 64. The source 12 and the reflector 14 make the beam converge to a narrow waist and diverge as shown in FIG. 1 to 3. The filters are located to intercept the beam at the waist, that is the narrowest portion of the beam. The beam thereafter diverges as it enters the chamber 22. As the diverging light beam 16 passes through the entrance port 18, a cylindrical mirror 78, having an interior reflecting surface 80, reflects the outer margin of the beam diagonally across the beam. In this way, the light from one side of the beam now passes to the other side. Thus, the colored portion of the beam is reflected to the white portion and the white portion toward the colored portion. This improves the mixing process within the mixing chamber.

The translucent diffusing plate 52 at the bottom exit 26 tapers outwardly from a thick, circular center 82 toward a thin, circular rim 84 as shown in FIGS. 1 and 6. From the circular rim 84, the material remains thin at the corner margins 86 toward a thickened square, support frame 88. The entire plate is monolithic and composed of a diffusing or scattering material.

The diffusion plate 52 exhibits a variable degree of diffusion. The diffusion is greater at the center and gradually tapers off toward the rim 84. The diffusion plate 52 is constructed by molding or machining a material which has a diffusion characteristic that is a function of its thickness. Therefore, increasing the thickness increases diffusion. To obtain the desired effect, it is then only necessary to produce a greater thickness at the center than toward the edges.

An acrylic resin with minute reflective particles in suspension is used. Such a material has the desired characteristics of increasing diffusion with thickness. The variable diffusion plate 52 scatters more of its light at the center and transmits more at its edges. As a result, more light is transmitted at the edges and less at the center.

This selective transmission at the edges as compared to the center has the effect of compensating for the fall-off in intensity from the center to the edges experienced when using uniform diffuser. This results from the cosine law fall-off occurring from the center of the light beam toward the edges. The chamber maintains this fall-off.

The diffusion plate 52 returns some of the scattered light into the chamber 22 while the remaining light passes through the diffusion plate. This effect, aside from producing uniformity, increases efficiency. Thus, the total light output of the system is raised significantly.

Also, raising the efficiency of the system significantly is the carrier 56 which is illustrated in detail in FIG. 7. Here, the upper surface 89 of the carrier is either painted white or mirrored. This mirrored surface reflects any light emerging from the diffuser 52 back to the diffuser 52 and into the chamber 22. The amount of light reflected back depends upon the size of the borders of the carrier. If the film 54, or the image on the film 54, is substantially as large as the diffuser 52, very little reflection is obtained. However, such reflection is in no sense needed because the carrier is not reducing the efficiency of the system. However, when the borders of the carrier are large and the aperture formed by the carrier is small to accommodate a small film 54 or image on the film 54, only a small portion of the light passing through the diffusing plate 52 is used to illuminate the film 54. In that case a large part of the light is reflected back by the mirrored or white surface 89 on the carrier 56.

The bottom surface 90 of the plate 52 has a matte finish. This prevents the plate 52 from rereflecting the upwardly directed light. It allows most of the light to pass from the surface 89 into the mixing chamber 22.

FIGS. 8 and 9 illustrate details of the mechanism which moves the filters 32, 34 and 36 in response to the wheels 42, 44 and 46. A lever 96, when turned upwardly, moves the arm 72 so that the attenuator 74 enters the light beam. The same lever 96, when moved downwardly, causes the arm 68 to draw the holders 40 and hence the filters 32, 34 and 36 back out of the path of the beam 16. This simple means can produce colored light, all-white light, or an attenuated exposure, with but a single lever.

It can be seen from FIGS. 8 and 9 that the movement of the filters 32, 34 and 36 in FIGS. 1, 2 and 3 is shown somewhat schematically. That is, the filters do not move precisely up and down. Rather, they move angularly.

Figure 10:
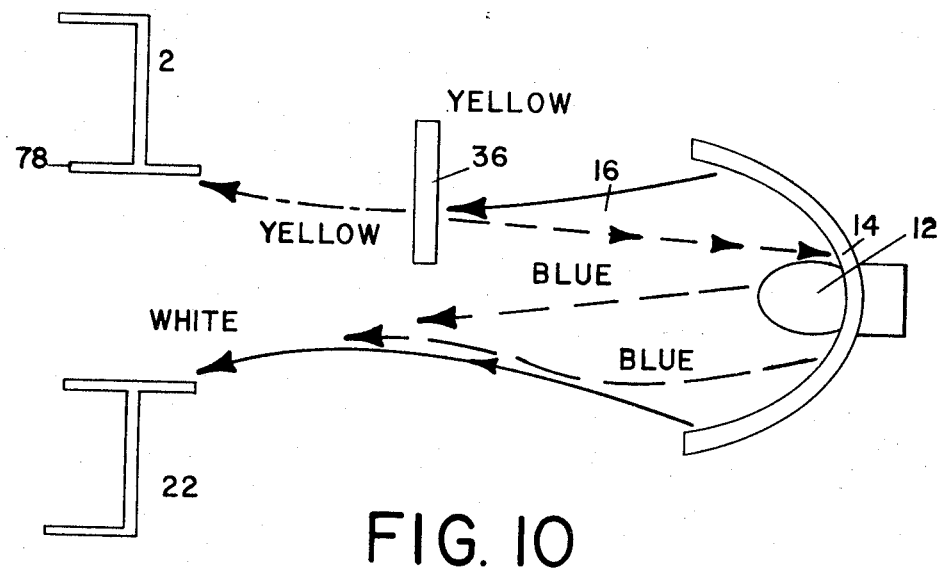
FIG. 10 is a somewhat schematic view of the beam source and filters illustrating the operation of the device without the attenuator.
Figure 11:
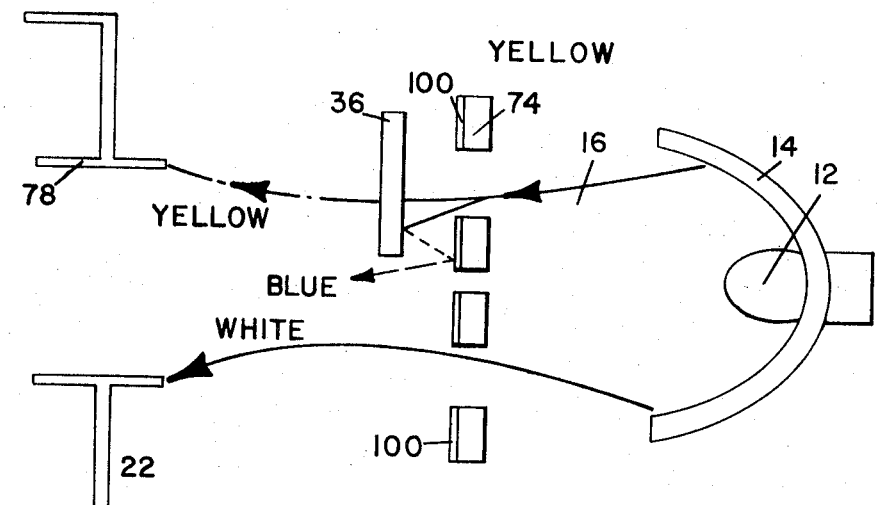
FIG. 11 is a schematic view comparable to FIG. 10 illustrating the use of the attenuator.

The effect of the attenuator 74 on the chromaticity of the light beam 16 appears in FIGS. 10 and 11. FIG. 10 illustrates the operation of the source 12, reflector 14 and the filters without the attenuator. FIG. 11 schematically illustrates the operation of the members 12, 14 and the filters with the attenuator 74. In this regard it should be noted that, for purposes of this discussion, only the effect of one filter is considered. However, this discussion applies equally to any combination of filters.

When the attenuator 74 is out of the path of the beam 16, the beam 16 produced by the source 12 and the reflector 14 is substantially white as illustrated in solid lines. A portion of the white light passes the dichroic filters, all represented by the single yellow dichroic filter 36. Another portion of the white light is intercepted by the yellow filter 36. Yellow light, illustrated in dot-dash lines, emerges from the filter 36. The blue content of the white light, illustrated in broken lines, is reflected backwards into the reflector 14. A portion of this blue light fitting the reflector 14 bounces back and joins the portion of the white beam that bypasses the filters. Thus, the light entering the mixing chamber 22 is composed of yellow light as well as white light enriched by some blue rays. It might be said that the yellow light reaching the mixing chamber is diluted or enriched by the blue returning from the reflector 14. This in itself produces no substantial undesireable results because it is accounted for by the color density calibration which can be read on the indicator (not shown).

FIG. 11 illustrates the effect of the light attenuator 74. Here, only 25% of the light formed by the source 12 and the beam 14 passes through the aperture 76 in the attenuator 74. The remaining 75% is reflected back by the surface. facing the reflector 14. Of the white light surviving the attenuator 74 a portion strikes the filter 36 and is divided into yellow light which passes through the filter and blue light that is reflected back toward the attenuator. The remaining portion of the white beam surviving the attenuator 74 continues unfiltered in a direction parallel to the yellow light. A reflecting surface 100 on the side of the attenuator 74 facing the filter 36 reflects the filter-rejected blue light back in the direction of the white light. Some of this blue light then enriches the portion of the beam passing the filter.

In the absence of the reflecting surface 100, the blue light would have been absorbed. This would have caused a different color balance or chromaticity in the light entering the mixing chamber 22. However, the reflecting surface 100 has the effect of again enriching the white light with approximately the same proportion of blue light as occurred in FIG. 10 without the attenuator 74. As a result, a color shift is avoided. The surface 100 reflects at least 50% of the incident light.

In operation therefor, an operator may simply shift between the attenuated light beam and the full beam without fear of color shift. It should be understood that although only a yellow filter was considered in the explanation of FIGS. 10 and 11 the effect is substantially identical for all combinations of filters 32, 34 and 36.

An operator, therefore, when he wishes to avoid exposure time less than 5 seconds needs merely flip the attenuator into position and utilize the system as if no attenuator were being used.

According to another embodiment of the invention the surface 100 is mirrored.

To use the enlarger, an operator, on the basis of the color balance of the image of the film, the nature of the printing paper, and the color of the white source, dials the knurled wheels 42, 44 and 46 so that the filters 32, 33 and 34 intercept the beam to the desired extent. The mirror 78, chamber 22, diffuser 52 and carrier 56 then mix the colored portion of the beam 16 with the white. The resulting light illuminates the film 54. The optical system composed of the adjustable bellows 60, and objective 62 focuses an image of the film 52 on printing paper held by the carrier 64. To shift from bright to dim, the operator need merely shift lever 96 and thus arm 72 so that the attenuator is placed in the path of the beam. To shift to bright the operator moves lever 96 to draw back the attenuator.

While embodiments of the invention have been disclosed in detail, it would be obvious to those skilled in the art that the invention may be embodied otherwise without departing from its spirit and scope.

What is claimed is:

1. An illuminating system, comprising source means having a reflector for forming a light beam, filter means in the path of a portion of the beam for coloring a portion of the beam one color and reflecting another color back toward the source means, mixing chamber means having an opening in the path of the beam and opaque dispersing means for mixing the light of the beam entering said chamber means, said chamber means having an exit window for allowing egress of the light from said chamber means, diffusing means at said window for diffusing light as it leaves said chamber means, and attenuator means movable into and out of the beam at a location between said source means and said filter means, said attenuator means including an opaque plate forming a plurality of perforations, said opaque plate having a side facing said filter means, said side being substantially reflective.

2. An enlarger, comprising a housing, source means having a reflector in said housing for forming a light means, filter means in said housing and in the path of a portion of the beam for coloring a portion of the beam one color and reflecting another color back toward the source means, mixing chamber means in said housing and having an opening in the path of the beam, said mixing chamber means having opaque dispersing means for mixing the light of the means beam entering said chamber means having an exit window for allowing egress of the light from said chamber means, a transparent diffusing plate in said housing and covering the window for diffusing light as it leaves said chamber means, film holder means adjacent said diffusing plate and in the path of light from said chamber means, optical means in said housing for focusing light passing through said film holder means, printing paper support means, mounting means for adjustably mounting said housing relative to said printing paper support means, and attenuator means in said housing, said attenuator means being movably mounted into and out of the path of the beam at a location between said source means and said filter means, said attenuator means including an opaque plate forming a plurality of perforations, said plate having a side facing said filter means, said side being reflective.

3. A system, as in claim 1, wherein said side is more reflective than absorbtive.

4. An enlarger, as in claim 2, wherein said side is more reflective than absorbtive.

5. A system, as in claim 1, wherein said side is mirrored.

6. An enlarger, as in claim 2, wherein said side is mirrored.

7. An apparatus, as in claim 1, wherein said plate has a second side facing said source means, said second side being substantially reflective.

8. An apparatus, as in claim 2, wherein said plate has a second side facing said source means, said second side being substantially reflective.

9. An apparatus, as in claim 7, wherein said reflective side is substantially mirrored.

10. An apparatus, as in claim 8, wherein said first side is mirrored.

11. An apparatus as in claim 1, wherein said filter means includes a dichroic filter.

12. An apparatus as in claim 2, wherein said filter means includes a dichroic filter.

13. An apparatus as in claim 3, wherein said filter means includes a dichroic filter.

14. An apparatus as in claim 4, wherein said filter means includes a dichroic filter.

15. An apparatus as in claim 5, wherein said filter means includes a dichroic filter.

16. An apparatus as in claim 6, wherein said filter means includes a dichroic filter.

17. An apparatus as in claim 7, wherein said filter means includes a dichroic filter.

18. An apparatus as in claim 8, wherein said filter means includes a dichroic filter.

19. An apparatus as in claim 9, wherein said filter means includes a dichroic filter.

20. An apparatus as in claim 10, wherein said filter means includes a dichroic filter.

* * * * *